US012357854B2

(12) United States Patent
Kjellman

(10) Patent No.: US 12,357,854 B2
(45) Date of Patent: Jul. 15, 2025

(54) FIRE SUPPRESSION AND ISOLATION SYSTEM

(71) Applicant: KIDDE-FENWAL, LLC, Ashland, MA (US)

(72) Inventor: Thomas Carl Kjellman, Uxbridge, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 252 days.

(21) Appl. No.: 16/973,225

(22) PCT Filed: Aug. 20, 2019

(86) PCT No.: PCT/US2019/047148
§ 371 (c)(1),
(2) Date: Dec. 8, 2020

(87) PCT Pub. No.: WO2020/046624
PCT Pub. Date: Mar. 5, 2020

(65) Prior Publication Data

US 2021/0322804 A1 Oct. 21, 2021

Related U.S. Application Data

(60) Provisional application No. 62/724,887, filed on Aug. 30, 2018.

(51) Int. Cl.
*A62C 2/08* (2006.01)
*A62C 3/00* (2006.01)

(52) U.S. Cl.
CPC ................ *A62C 2/08* (2013.01); *A62C 3/006* (2013.01)

(58) Field of Classification Search
CPC .. A62C 2/08; A62C 3/006; A62C 3/14; A62C 37/36; F24C 15/2021
(Continued)

(56) References Cited

U.S. PATENT DOCUMENTS

| | | | | |
|---|---|---|---|---|
| 3,616,744 A * | 11/1971 | Jensen | F24C 15/20 | 55/444 |
| 4,315,456 A * | 2/1982 | Hayashi | A62B 5/00 | 169/48 |

(Continued)

FOREIGN PATENT DOCUMENTS

| | | |
|---|---|---|
| DE | 848914 C | 9/1952 |
| DE | 29600140 U1 | 2/1996 |

(Continued)

OTHER PUBLICATIONS

Machine Translation of JP-2004313753-A Description, Mar. 2023, Espacenet, 12 Pages (Year: 2023).*

(Continued)

*Primary Examiner* — Arthur O. Hall
*Assistant Examiner* — Kevin Edward Schwartz
(74) *Attorney, Agent, or Firm* — Honigman LLP

(57) ABSTRACT

A fire suppression and isolation system includes an ejection nozzle, a dispersion nozzle, and a valve assembly. The ejection nozzle is positioned between a non-hazard volume and a hazard volume. The dispersion nozzle is spaced apart from the ejection nozzle and is disposed within the hazard volume. The valve assembly is arranged to control a release of a suppression medium from a container to the ejection nozzle and the dispersion nozzle, responsive to a thermal event, such that the suppression medium that is ejected from the ejection nozzle defines a fluid barrier that is disposed between the non-hazard volume and the hazard volume.

12 Claims, 4 Drawing Sheets

(58) Field of Classification Search
USPC .......................... 169/70, 65; 126/25 C, 299 R
See application file for complete search history.

(56) References Cited

U.S. PATENT DOCUMENTS

| | | | | | |
|---|---|---|---|---|---|
| 4,524,835 | A * | 6/1985 | Mingrone | A62C 3/006 | 169/65 |
| 4,580,638 | A * | 4/1986 | Jones | A62C 3/006 | 169/59 |
| 5,072,658 | A | 12/1991 | Bogage | | |
| 5,868,205 | A * | 2/1999 | Cunningham | A62C 3/006 | 169/65 |
| 6,186,241 | B1 * | 2/2001 | Murr | A62C 3/006 | 169/65 |
| 6,334,812 | B2 | 1/2002 | Laborde et al. | | |
| 6,450,879 | B1 | 9/2002 | Suen | | |
| 6,918,447 | B2 * | 7/2005 | Robinson, Jr. | E06B 9/0692 | 169/48 |
| 6,935,433 | B2 * | 8/2005 | Gupta | A62C 99/0018 | 169/46 |
| 7,503,842 | B2 | 3/2009 | Lee et al. | | |
| 7,810,576 | B2 | 10/2010 | Reick | | |
| 8,308,082 | B2 * | 11/2012 | Ivy | A62C 31/05 | 169/25 |
| 9,010,449 | B2 * | 4/2015 | Eckholm | A62C 3/16 | 169/46 |
| 9,551,500 | B2 | 1/2017 | Berben et al. | | |
| 2006/0048951 | A1 | 3/2006 | Sundholm et al. | | |
| 2008/0041598 | A1 * | 2/2008 | Reick | A62C 2/18 | 169/45 |
| 2008/0057851 | A1 | 3/2008 | Valkeapaa | | |
| 2009/0008105 | A1 * | 1/2009 | Price | A62C 27/00 | 169/52 |
| 2010/0101809 | A1 * | 4/2010 | Christensen | A62C 3/006 | 169/65 |
| 2010/0291856 | A1 * | 11/2010 | Berben | F24F 9/00 | 454/192 |
| 2013/0025888 | A1 * | 1/2013 | Eckholm | A62C 3/16 | 169/61 |
| 2017/0014656 | A1 * | 1/2017 | Smith | B64C 19/00 | |
| 2017/0106221 | A1 * | 4/2017 | Gatsonides | A62C 99/0018 | |

FOREIGN PATENT DOCUMENTS

| | | | | | |
|---|---|---|---|---|---|
| DE | 19542714 | A1 | | 5/1997 | |
| DE | 10226751 | A1 | | 1/2004 | |
| DE | 10240745 | A1 | | 3/2004 | |
| DE | 202009012529 | U1 | | 9/2009 | |
| EP | 2366434 | A1 | * | 9/2011 | A62C 2/08 |
| EP | 2995877 | A2 | | 3/2016 | |
| GB | 2351441 | A | | 1/2001 | |
| JP | 2004313753 | A | | 11/2004 | |
| KR | 101553036 | B1 | | 9/2015 | |
| WO | 2007056896 | A1 | | 5/2007 | |
| WO | 2011092448 | A1 | | 8/2011 | |

OTHER PUBLICATIONS

G. Krajewski et al., Air curtain as a barrier for smoke in case of fire: Numerical modelling, Bulletin of the Polish Academy of Sciences, Technical Sciences, 2015, pp. 145-153, vol. 63, No. 1, Poland.

Grzegorz Krajewski et al., Air Curtains used for separating smoke free zones in case of fire, Proceedings of Building Simulation 2011: 12th Conference of International Building Performance Simulation Association, Nov. 14-16, 2011, pp. 2773-2777, Sydney.

International Search Report Application No. PCT/US2019/047148; Issued Oct. 30, 2019; p. 52.

Written Opinion No. PCT/US2019/047148; Issued Oct. 30, 2019; pp. 10.

* cited by examiner

FIRE SUPPRESSION AND ISOLATION SYSTEM

BACKGROUND

Exemplary embodiments pertain to the art of fire suppression systems.

Fire suppression systems may be arranged to deliver a liquid or a dry chemical powder to extinguish or control a hazard such as a fire. In some environments, the hazard may be partially enclosed, such as in a commercial kitchen, making isolation of the hazard from a surrounding space difficult.

BRIEF DESCRIPTION

Disclosed is a fire suppression and isolation system that includes an ejection nozzle, a dispersion nozzle, and a valve assembly. The ejection nozzle is positioned between a non-hazard volume and a hazard volume. The dispersion nozzle is spaced apart from the ejection nozzle and is disposed within the hazard volume. The valve assembly is arranged to control a release of a suppression medium from a container to the ejection nozzle and the dispersion nozzle, responsive to a thermal event, such that the suppression medium ejected from the ejection nozzle defines a fluid barrier that is disposed between the non-hazard volume and the hazard volume.

In addition to one or more of the features described above, or as an alternative to any of the foregoing embodiments, wherein the suppression medium is at least one of water, air, an inert gas, and a clean agent.

In addition to one or more of the features described above, or as an alternative to any of the foregoing embodiments, the dispersion nozzle is arranged to disperse the suppression medium within the hazard volume.

In addition to one or more of the features described above, or as an alternative to any of the foregoing embodiments, the ejection nozzle is at least partially disposed on a workstation that is spaced apart from a hood.

In addition to one or more of the features described above, or as an alternative to any of the foregoing embodiments, a deflector that is spaced apart from and is proximately aligned with the ejection nozzle, the deflector being arranged to deflect at least a portion of the fluid barrier towards the hazard volume.

In addition to one or more of the features described above, or as an alternative to any of the foregoing embodiments, the ejection nozzle is at least partially disposed in a hood that is spaced apart from a workstation.

In addition to one or more of the features described above, or as an alternative to any of the foregoing embodiments, a fluid return having a return inlet that is spaced apart from and is proximately aligned with the ejection nozzle.

In addition to one or more of the features described above, or as an alternative to any of the foregoing embodiments, the fluid return is at least partially defined by the workstation.

In addition to one or more of the features described above, or as an alternative to any of the foregoing embodiments, the fluid return includes a return duct that at least partially extends through the workstation.

Also disclosed is a fire suppression and isolation system that includes an ejection nozzle, a dispersion nozzle, and a container. The ejection nozzle is disposed on at least one of a hood and a workstation. The ejection nozzle is disposed proximate a hazard volume. The dispersion nozzle is spaced apart from the ejection nozzle and extends towards the hazard volume. The container contains a suppression medium and is disposed proximate the hood. The container is fluidly connected to the ejection nozzle and the dispersion nozzle.

In addition to one or more of the features described above, or as an alternative to any of the foregoing embodiments, the hazard volume is at least partially defined between the workstation and the hood that is spaced apart from the workstation.

In addition to one or more of the features described above, or as an alternative to any of the foregoing embodiments, the ejection nozzle is arranged to eject the suppression medium towards at least one of an edge of the workstation and a front edge of the hood.

In addition to one or more of the features described above, or as an alternative to any of the foregoing embodiments, the ejected suppression medium defines a fluid barrier between the hazard volume and a non-hazard volume.

In addition to one or more of the features described above, or as an alternative to any of the foregoing embodiments, the fluid barrier is formed as a curtain of laminar flow of the suppression medium.

In addition to one or more of the features described above, or as an alternative to any of the foregoing embodiments, the dispersion nozzle is arranged to disperse the suppression medium towards the workstation.

In addition to one or more of the features described above, or as an alternative to any of the foregoing embodiments, the fluid barrier is arranged to inhibit the suppression medium from flowing into the non-hazard volume.

In addition to one or more of the features described above, or as an alternative to any of the foregoing embodiments, the ejection nozzle is arranged to eject the suppression medium at a first flow rate.

In addition to one or more of the features described above, or as an alternative to any of the foregoing embodiments, the dispersion nozzle is arranged to disperse the suppression medium at a second flow rate less than the first flow rate.

In addition to one or more of the features described above, or as an alternative to any of the foregoing embodiments, a fluid return that is spaced apart from and is proximately aligned with the ejection nozzle.

In addition to one or more of the features described above, or as an alternative to any of the foregoing embodiments, the fluid return is arranged to receive at least a portion of the suppression medium ejected from the ejected nozzle.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
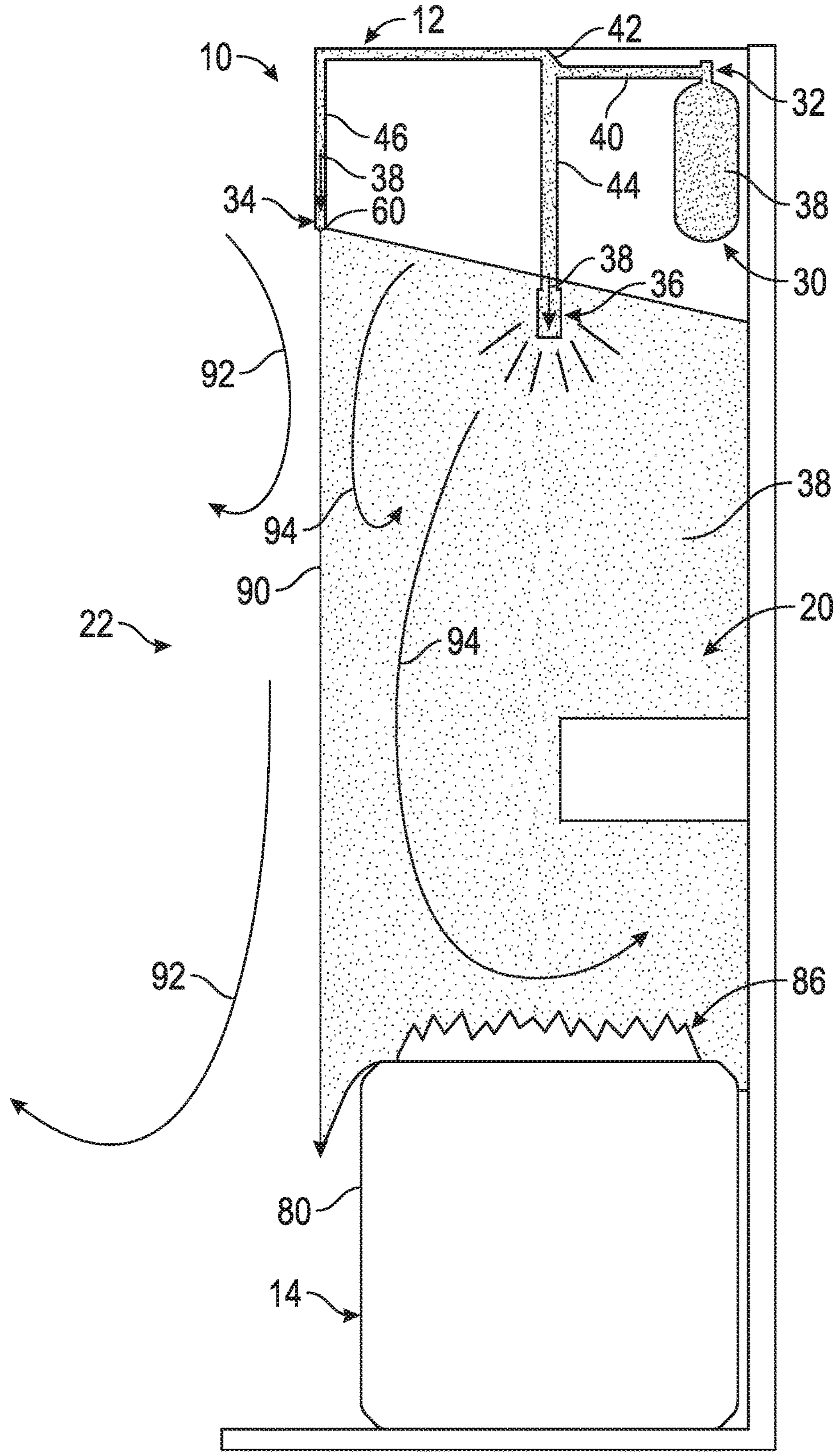
FIG. 1A is a partial view of a first embodiment of a fire suppression and isolation system.

A detailed description of one or more embodiments of the disclosed apparatus and method are presented herein by way of exemplification and not limitation with reference to the Figures.

Referring to FIGS. 1A-3, a fire suppression and isolation system 10 may be provided in an environment in which a hazard, such as a fire, may occur. The fire suppression and isolation system 10 may be incorporated into a hood 12, such as an exhaust hood, that is disposed over or disposed proximate a workstation 14. The workstation 14 may be an appliance, a cooktop, a broiler, a grill, a deep fat fryer, a weld station, a pharmaceutical or biological research station, as well as other appliances or devices in which a fire hazard may be present.

A hazard space or a hazard volume 20 may be at least partially defined between the workstation 14 and the hood 12. The hazard volume 20 may be area volume or space within which a fire hazard may occur or be present. A work space or a non-hazard volume 22 may be disposed proximate the hazard volume 20. The non-hazard volume 22 may be a volume containing outside air that may potentially flow towards the hazard volume 20. The non-hazard volume 20 may be a potentially occupied area in which a worker may be positioned to interface with the workstation 14. The presence of the worker may inhibit the implementation of a physical barrier or drop down barrier between the hazard volume 20 and the non-hazard volume 22 to separate the hazard volume 20 from the non-hazard volume 22 should there be a fire hazard present within the hazard volume 20.

The fire suppression and isolation system 10 may be arranged to contain or isolate the hazard volume 20 from the non-hazard volume 22, as well as suppressing or extinguishing the fire hazard present within the hazard volume 20. The fire suppression and isolation system 10 may be arranged to inhibit leakage, flow, or ingress of a suppression medium from the hazard volume 20 into the non-hazard volume 22.

The fire suppression and isolation system 10 may include a container 30, a valve assembly 32, an ejection nozzle 34, and a dispersion nozzle 36.

The container 30 contains a fluid and/or a suppression medium 38 may be disposed within or disposed proximate the hood 12. The fluid may be air, water, or the like. The suppression medium 38 may be a fire suppression agent that is at least one of an inert gas or a clean agent. The suppression medium 38 may include but not be limited to: air, carbon dioxide, nitrogen, argon, halon, HFC-125, HFC-227ea, FK-5-1-12, water, a wet chemical extinguishing agent, or a dry chemical extinguishing agent.

Figure 2:
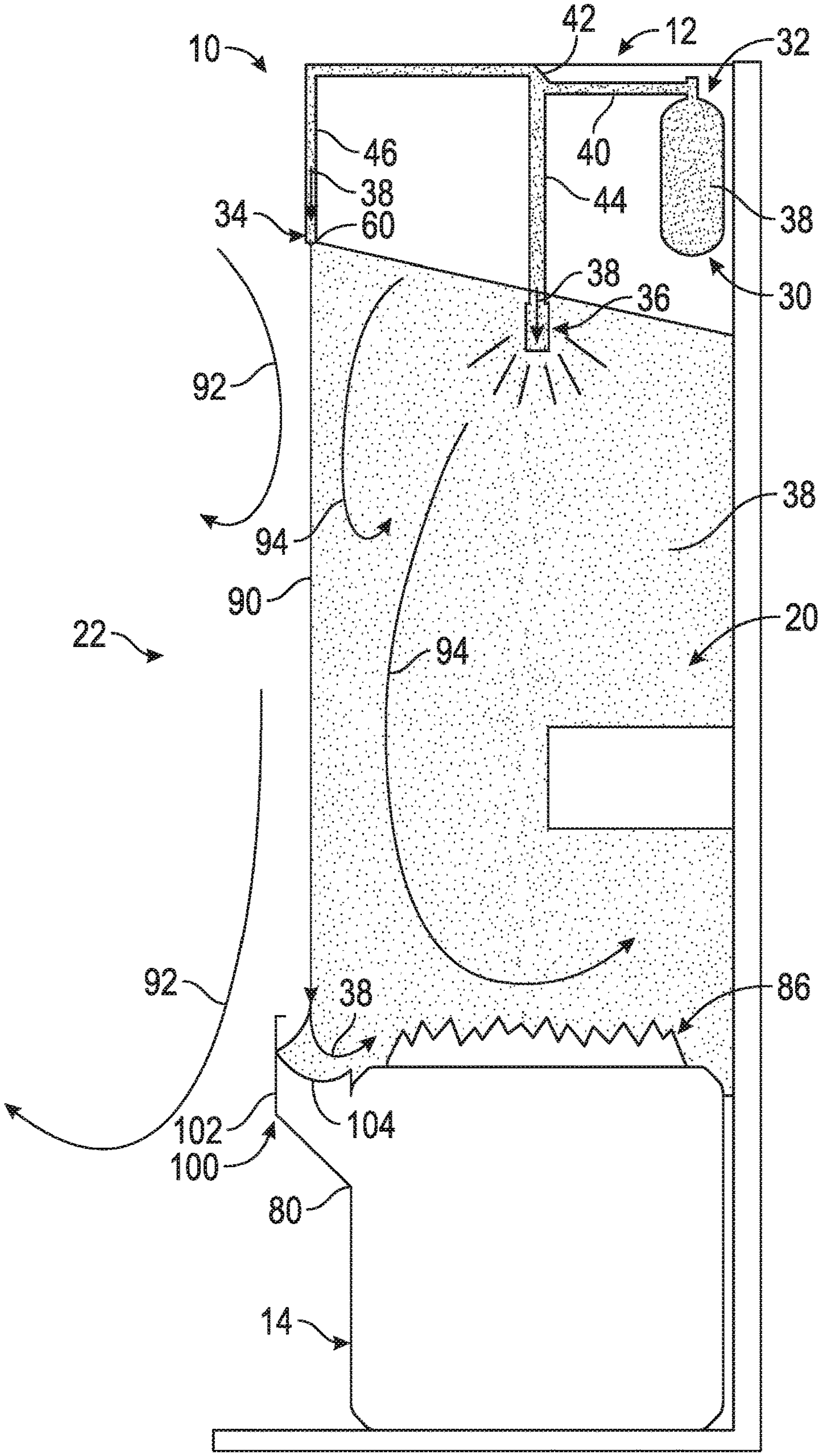
FIG. 2 is a partial view of a second embodiment of a fire suppression and isolation system.

The container 30 is fluidly connected to the ejection nozzle 34 and the dispersion nozzle 36 through a series of conduits via the valve assembly 32. A conduit 40 extends from the container 30 towards a junction 42. A first branch 44 extends from the junction 42 to the dispersion nozzle 36 and a second branch 46 extends from the junction 42 to the ejection nozzle 34, as shown in FIGS. 1A and 2.

Figure 1B:
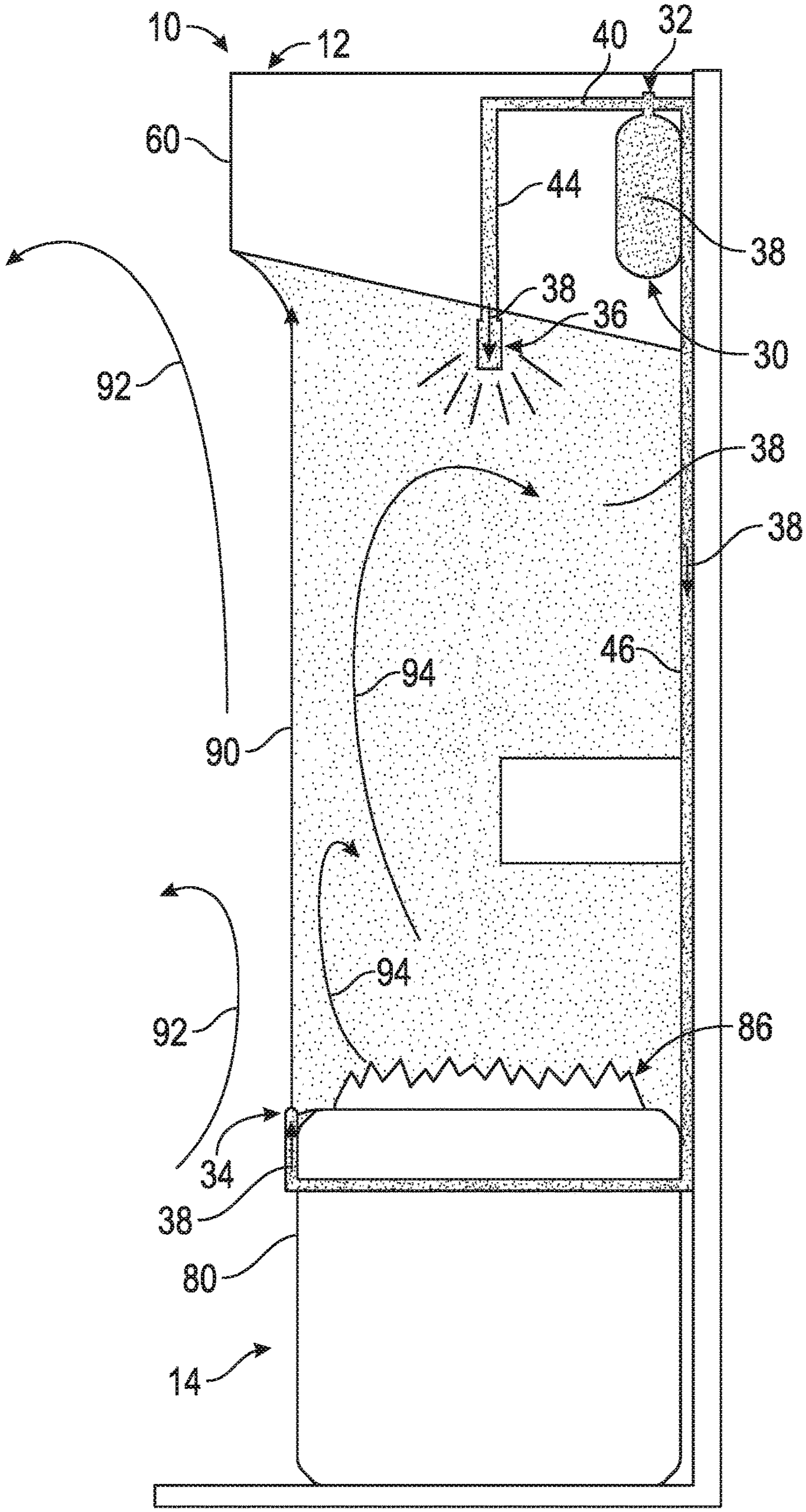
FIG. 1B is a partial view of an alternative first embodiment of the fire suppression and isolation system.

The conduit 40 may extend from the container 30, across a portion of the hood 12 towards the first branch 44 that extends from the hood 12 towards the workstation 14, as shown in FIG. 1B. The second branch 46 may extend from the conduit 40 and may extend from the hoods 12 towards the workstation 14 and at least partially across the workstation 14. A portion of the second branch 46 may extends across the workstation 14 towards the ejection nozzle 34 that is disposed at a forward edge of the workstation 14. In such an embodiment, the ejection nozzle 34 may eject the suppression medium 38 from the front edge of the workstation 14 towards the hood 12.

Figure 3:
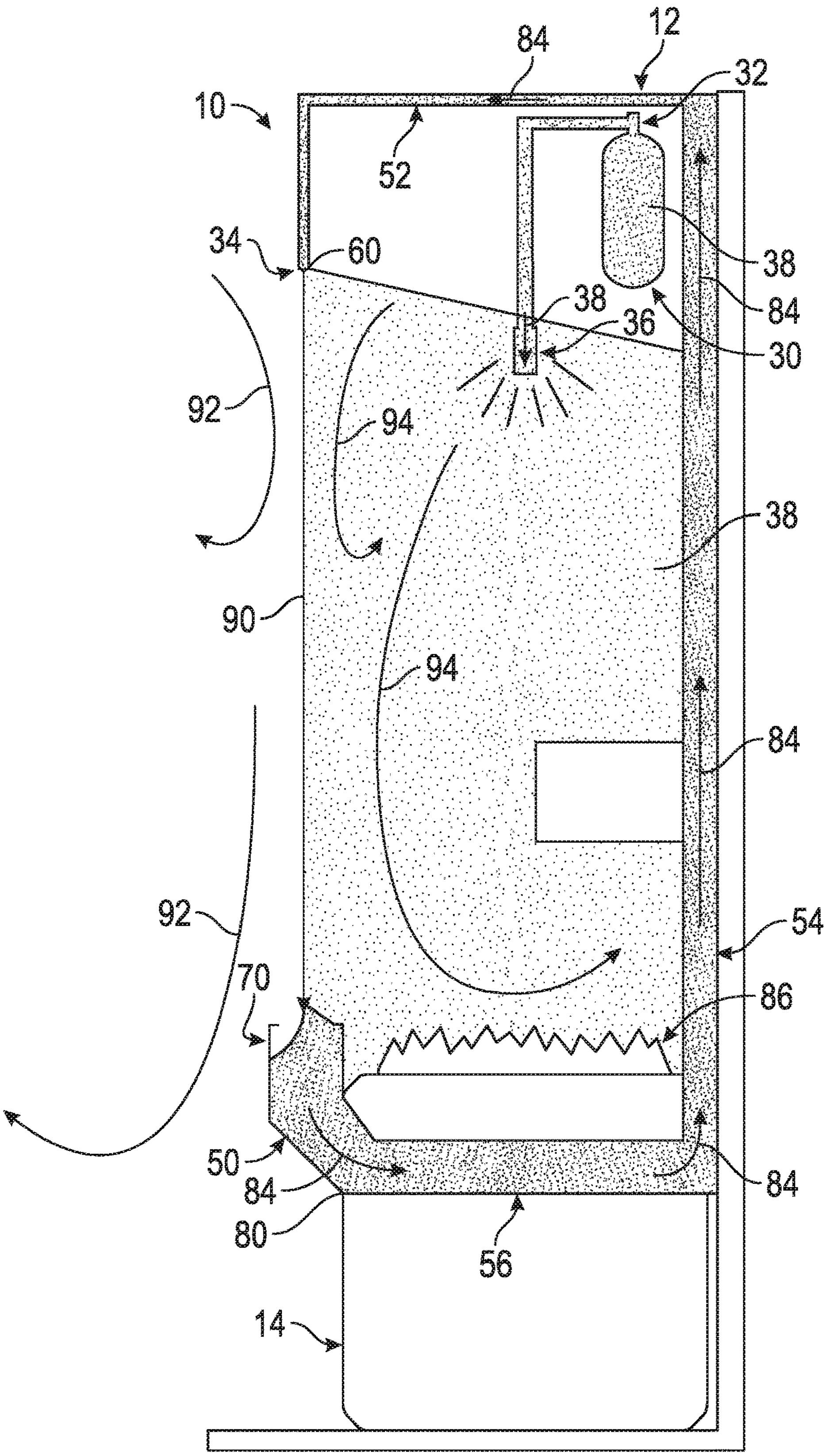
FIG. 3 is a partial view of a third embodiment of a fire suppression and isolation system.

Referring to FIG. 3, a fluid return 50 may be provided that may recycle, recirculate, or return the ejected suppression medium 38 from the ejection nozzle 34 to inhibit the ejected suppression medium 38 from entering the non-hazard volume 22.

The fluid return 50 includes a fluid passageway 52, a duct 54, and a return duct 56. The fluid passageway 52 extends from a front edge 60 of the hood 12 across the hood 12 towards the duct 54. The duct 54 extends between the hood 12 and the workstation 14. The duct 54 is fluidly connected to the fluid passageway 52 and the return duct 56. The return duct 56 may extend at least partially through, may extend at least partially across, or may extend at least partially around the workstation 14. The return duct 56 includes a return vent or a return inlet 70 that is spaced apart from and is proximately aligned with the ejection nozzle 34 and/or the front edge 60 of the hood 12. The return inlet 70 is disposed proximate an edge 80 of the workstation 14 and may be at least partially defined by the workstation 14 or may be provided as a component that is connected to the workstation 14. The edge 80 may be a forward edge of the workstation 14.

In embodiments in which the ejection nozzle 34 is disposed at the workstation 14, such as in FIG. 1B, the fluid passageway 52 may extend from the edge 80 of the workstation 14 across the workstation 14 towards the duct 54. The duct 54 may extend between the workstation 14 and the hood 12. The duct 54 is fluidly connected to the fluid passageway 52 and the return duct 56. The return duct 56 may extend at least partially through, may extend at least partially across, or may extend at least partially around the hood 12. The return duct 56 may include a return inlet 70 that is spaced apart from and is proximately aligned with the ejection nozzle 34 and/or the edge 80 of the workstation 14. The return inlet 70 may be disposed proximate the front edge 60 of the hood 12 and may be at least partially defined by the hood 12 or may be provided as a component that is connected to the hood 12.

A portion 84 of the ejected suppression medium 38 from the ejection nozzle 34 that forms a fluid barrier may flow from the ejection nozzle 34 towards and through the return inlet 70. The portion 84 of the ejected suppression medium 38 that enters the return inlet 70 may flow through the return duct 56 to the duct 54 and to the fluid passageway 52. The portion 84 of the ejected suppression medium 38 may continue to be recycled and returned through the fluid return 50 while the suppression medium 38 is being delivered to the hazard volume 20 by at least one of the ejection nozzle 34 and/or the dispersion nozzle 36.

Referring to FIGS. 1A, 1B, 2, and 3, the valve assembly 32 is arranged to control the release of the suppression medium 38 from the container 30 to the ejection nozzle 34 and the dispersion nozzle 36, responsive to a thermal event or a fire hazard 86 within the hazard volume 20. The suppression medium 38 may be released into the conduit 40 and directed towards the ejection nozzle 34 and the dispersion nozzle 36 through their respective conduit branches (e.g. the first branch 44 and the second branch 46).

The ejection nozzle 34 may be provided with or may be defined by the hood 12, as shown in FIGS. 1A, 2, and 3. The ejection nozzle 34 may be positioned between the non-hazard volume 22 and the hazard volume 20 while being spaced apart from the workstation 14. The ejection nozzle 34 may be generally aligned with the edge 80 of the workstation 14. The ejection nozzle 34 may be provided or positioned proximate the edge 80 of the workstation 14, as shown in FIG. 1B, positioned near the base of the fire hazard 86, or within a wall.

The ejection nozzle 34 may be arranged as an elongated opening that extends along an edge of the hood 12 or the workstation 14. The ejection nozzle 34 may be arranged as a plurality of fluid openings or fluid ports that may extend at least partially across an edge of the hood 12 or the workstation 14. The ejection nozzle 34 may be arranged as a single ejection nozzle or a plurality of ejection nozzles that at least partially extend from the hood 12 or the workstation 14.

The ejection nozzle 34 is arranged to eject the suppression medium 38 from the hood 12 towards the edge 80 of the workstation 14 to form a fluid curtain or a fluid barrier 90 that extends from the hood 12 towards the workstation 14, as shown in FIGS. 1A, 2, and 3. The ejection nozzle 34 may be arranged to eject the fluid and/or the suppression medium 38 from the edge 80 of the workstation 14 towards the front edge 60 of the hood 12 to form the fluid barrier 90 that extends from the workstation 14 towards the hood 12, as shown in FIG. 1B. The fluid barrier 90 may be formed as a generally vertical curtain of laminar flow of the fluid and/or the suppression medium 38 that is disposed between and isolates the hazard volume 20 from the non-hazard volume 22 to contain or isolate the thermal event or fire hazard 86 present within the hazard volume 20 from the non-hazard volume 22.

The fluid and/or the suppression medium 38 may be ejected by the ejection nozzle 34 at a first flow rate. The first flow rate may be pronounced such that the fluid barrier 90 inhibits a flow 92 of oxygen or other oxidizers from the non-hazard volume 22 from entering into the hazard volume 20 and inhibits a flow 94 of the fluid and/or the suppression medium 38 from within the hazard volume 20 from entering into the non-hazard volume 22.

Referring to FIG. 2, a deflector 100 may be provided to aid in directing or deflecting at least a portion of the fluid and/or the suppression medium 38 that forms the fluid barrier 90 towards the hazard volume 20/the fire hazard 86 and away from the non-hazard volume 22. The deflector 100 is spaced apart from and is proximately aligned with the ejection nozzle 34. The deflector 100 may be operatively connected to the workstation 14 and may be disposed proximate the edge 80 of the workstation 14. In at least one embodiment, the deflector 100 may be operatively connected to the hood 12 and may be arranged to direct the ejected suppression medium 38 from the ejection nozzle 34 disposed on the workstation 14 that forms the fluid barrier 90 towards the fire hazard 86 and away from the non-hazard volume 22.

The deflector 100 may include an extension 102 that extends from the edge 80 of the workstation 14 and a deflection surface 104. The deflection surface 104 may be defined by the extension 102 or may extend from the extension 102 towards the edge 80 of the workstation 14. The deflection surface 104 may be an arcuate surface or an angled surface that is arranged to deflect the suppression medium 38 that forms the fluid barrier 90 towards the fire hazard 86 or generally within the hazard volume 20.

Referring to FIGS. 1-3, the dispersion nozzle 36 is spaced apart from the ejection nozzle 34. The dispersion nozzle 36 is disposed proximate or within the hazard volume 20 and extends towards the workstation 14. The dispersion nozzle 36 is arranged to disperse the fluid and/or the suppression medium 38 within the hazard volume 20 and towards the workstation 14 at a second flow rate. The second flow rate may be less than the first flow rate of the first flow rate and/or the suppression medium 38 ejected from the ejection nozzle 34.

In at least one embodiment, the first flow rate of the fluid and/or the suppression medium 38 from the ejection nozzle 34 and/or the second flow rate of the fluid and/or the suppression medium 38 from the dispersion nozzle 36 may be independently variable. The respective flow rates may be varied by additional valve assemblies that are fluidly connected to the first branch 44 and the second branch 46 or by the valve assembly 32.

The ejection of the fluid and/or the suppression medium 38 through the ejection nozzle 34 and the dispersion of the fluid and/or the suppression medium 38 through the dispersion nozzle 36 may occur substantially simultaneously responsive to detection of the thermal event or fire hazard 86 within the hazard volume 20, by a sensor or thermal detection element that may be in communication with valve assembly 32 of the fire suppression and isolation system 10.

The containment or isolation of the hazard volume 20 from the non-hazard volume 22 by the fire suppression and isolation system 10 may present benefits such as: provide a cleaner method of fire suppression that may not create collateral damage to the hazard volume 20 or non-hazard volume 22; reduce cleanup time required after a discharge from the fire suppression and isolation system 10; reduce a duration of a shutdown of the workstation 14 after suppression or extinguishing of a fire hazard 86; containing the suppression medium 38 within the hazard volume 20; independently controlling the atmosphere about a fire hazard 86 by isolating hazard volume 20 containing the fire hazard 86 from the non-hazard volume 22; and controlling an amount of the suppression medium 38 present within the hazard volume 20.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire suppression and isolation system, comprising:

a hood;

a workstation including a back wall, the workstation including a heat generating appliance, the heat generating appliance disposed underneath the hood and in front of the back wall so as to be partially enclosed by the hood and the back wall, a hazard volume being located between the work station and the hood, a non-hazard volume being outside of the hood and workstation, the heat generating appliance being one of a cooktop, a broiler, a grill, a deep fat fryer, and a weld station an ejection nozzle disposed on a distal end of the hood and positioned between the non-hazard volume and the hazard volume;

a dispersion nozzle spaced apart from the ejection nozzle and disposed within the hazard volume; and a valve assembly arranged to control a release of a suppression medium from a container to the ejection nozzle and the dispersion nozzle, responsive to a thermal event, such that the suppression medium ejected from the ejection nozzle defines a fluid barrier that is disposed between the non-hazard volume and the hazard volume;

a fluid return having a return inlet that is spaced apart from and is axially aligned with the ejection nozzle, the return inlet fluidly coupled to a passageway that extends along the back wall and is fluidly coupled to the ejection nozzle so as to recycle so as to recycle the suppression medium; and wherein the ejection nozzle is arranged to eject the suppression medium at a first flow rate; and the dispersion nozzle is arranged to disperse the suppression medium at a second flow rate that is less than the first flow rate.

2. The fire suppression and isolation system of claim 1, wherein the suppression medium is at least one of water, air, an inert gas, and a clean agent.

3. The fire suppression and isolation system of claim 1, wherein the dispersion nozzle is arranged to disperse the suppression medium within the hazard volume.

4. The fire suppression and isolation system of claim 1, wherein the ejection nozzle is at least partially disposed on the workstation.

5. The fire suppression and isolation system of claim 1, further comprising a deflector that is spaced apart from and is proximately aligned with the ejection nozzle, the deflector being arranged to deflect at least a portion of the fluid barrier towards the hazard volume.

6. The fire suppression and isolation system of claim 1, wherein the ejection nozzle is at least partially disposed in a hood.

7. The fire suppression and isolation system of claim 1, wherein the fluid return is at least partially defined by the workstation.

8. The fire suppression and isolation system of claim 1, wherein the ejection nozzle is arranged to eject the suppression medium towards at least one of an edge of the workstation and a front edge of the hood.

9. The fire suppression and isolation system of claim 1, wherein the fluid barrier is formed as a curtain of laminar flow of the suppression medium.

10. The fire suppression and isolation system of claim 1, wherein the dispersion nozzle is arranged to disperse the suppression medium towards the workstation.

11. The fire suppression and isolation system of claim 10, wherein the fluid barrier is arranged to inhibit the suppression medium from flowing into the non-hazard volume.

12. The fire suppression and isolation system of claim 1, wherein the fluid return is arranged to receive at least a portion of the suppression medium ejected from the ejection nozzle.

* * * * *